March 11, 1952 M. B. SENNET 2,588,888
PUMP
Filed Feb. 8, 1949

INVENTOR.
MORGAN B. SENNET
BY
ATTORNEYS

Patented Mar. 11, 1952

2,588,888

UNITED STATES PATENT OFFICE 2,588,888

PUMP

Morgan B. Sennet, Trenton, N. J., assignor to De Laval Steam Turbine Company, Trenton, N. J., a corporation of New Jersey Application February 8, 1949, Serial No. 75,108

8 Claims. (Cl. 103—128)

This invention relates to screw pumps and particularly to positive type screw pumps such as disclosed in the patent to Montelius 1,698,802, dated January 15, 1929, though the invention is also applicable to other screw pumps in which the screws are subject to lateral thrusts.

Pumps made in accordance with said patent are capable of operating at high speeds with production of very high pressures. The screws of these pumps are housed in intersecting bores which serve to journal the screws, the diameters of which are only slightly less than the diameters of the bores to provide a minimum of clearance. Timing gears connecting the screws are unnecessary since the cross sections of the screw threads constitute, in effect, gear teeth whereby the screws are constantly maintained in proper relative phases. The idler screws present edges which could theoretically be sharp but which are usually very slightly flattened so as to provide better bearing upon the thread surfaces of a power screw or screws. By utilizing the design principles set forth in Montelius Patent 1,965,557, dated July 3, 1934, the transmission of mechanical power from the power screw or screws by contact with the idler or idlers may be minimized, the drive of the idlers being at least primarily occasioned by the fluid pressure.

It is characteristic of these pumps, however, that the fluid pressures set forth produce a radial thrust on each idler in a direction perpendicular to the plane through its axis and the intermeshing power screw tending to force it against the portion of its mounting bore toward which it turns directly from the power screw. This creates substantial friction which limits the working pressures against which pumping is effected. The friction also increases the starting torque and wear on the idlers and the housing. Furthermore, under the pressures encountered due to this thrust the edges of the idler screw threads tend to wipe lubricant from the bore surface so that the pump is limited to the handling at high pressures of liquids which, despite this action, will nevertheless maintain proper films for good lubrication.

Recognition of this problem has led to various attempts to balance the thrust by the introduction of liquid under pressure to the surfaces of contact between the idler threads and their bores. External liquid feed openings in the casing or internal feed of the pumped liquid, through openings drilled or otherwise formed in the idler screws, have been proposed but these expedients have various disadvantages. First, they provide only a local introduction of the liquid to the surfaces subject to the thrust and secondly, and even more serious, they constitute leakage paths for the liquid which materially reduce the capacity of the pump and the positive nature of the pumping action.

It is the general object of the present invention to provide for the balancing of thrust on the idlers by the introduction of liquid under pressure between the cylindrical mating surfaces of the idler screws and their bores without the disadvantages already noted. In brief, this is accomplished by providing in the bore surfaces through the region where the thrust appears axially extending shallow slots of lengths slightly less than the axial extents of the cylindrical faces of the idler screw threads. In this fashion liquid under pressure is introduced from the idler screw grooves effectively throughout the extent of the cylindrical surfaces where thrust occurs. At the same time there is avoided the production of any bypassing path for the liquid flow and, at most, the loss of liquid is reduced to an amount corresponding to or less than the small volumes which fill the axial grooves. As a result of the invention there is no substantial diminution of the volumetric displacement of the pump and by virtue of the effective lubrication friction and wear are greatly reduced with the attendant result that liquids of low film strength may be used with a permissibly wider choice of materials for the runners and their housings.

The broad object of the present invention as well as subsidiary objects relating to details of construction and operation will become apparent from the following description read in conjunction with the accompanying drawings in which.

The casing of the pump is illustrated at 2 while the housing containing the bores for the reception of the screws is indicated generally at 4 and comprises two halves 4A and 4B, this construction of the housing being adopted to permit the machining of the grooves referred to hereafter.

The power screw of the pump is indicated at 6 and the idlers are indicated at 8 and 10. The type of pump illustrated which has one power screw having two threads and two identical idler screws each having two threads is generally to be preferred for high pressure operation since in this arrangement the thrusts on the power screw are balanced.

It will be obvious, however, that the invention is applicable to other screw arrangements as set forth in Montelius Patent 1,698,802 to form positive pumps. Furthermore, it will be evident that the invention is applicable to non-positive screw pumps such as may be produced by departure from the criteria set forth in Montelius 1,698,802: for example, to such nonpositive pumps as may be produced by meshing with a power screw containing two threads, three, four or five idlers each containing two threads or by various other screw arrangements. The invention is also applicable to screw pumps of other types; for example to Quimby pumps. The invention, however, is particularly advantageous in the case of positive multiple screw pumps which are adapted to produce extremely high pressures with corresponding great thrust on the idler screws.

To complete the general description of the pump it may be pointed out that there is an inlet passage 12 and an outlet passage 14 and that the power screw 6 is provided with a shaft extension 16 through which the pump is driven. Suitable conventional bearings are provided which need not be detailed.

Figure 1:
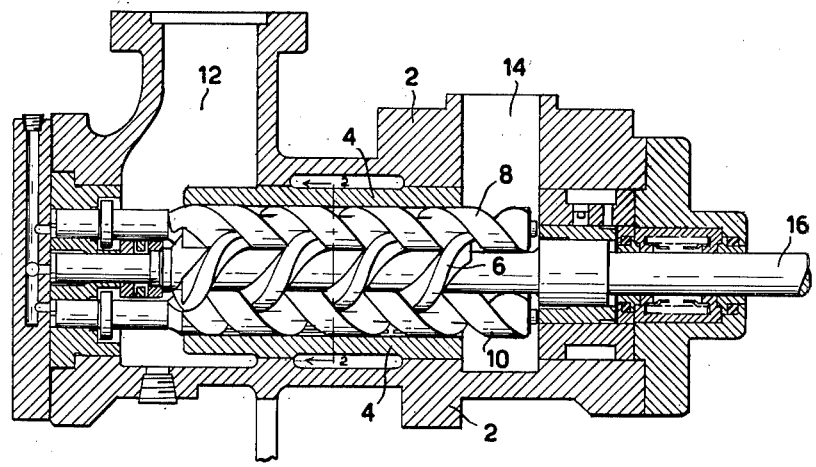
Figure 1 is an axial section taken through a typical screw pump of the type to which the invention relates.
Figure 2:
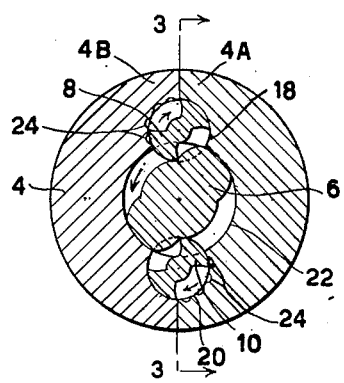
Figure 2 is a transverse section taken on the plane indicated at 2—2 in Figure 1.
Figure 3:
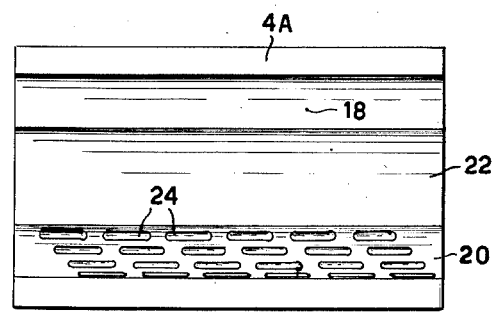
Figure 3 is an inside view of one of the housing sections looking in the direction indicated at 3—3 in Figure 2.

As will be evident, particularly from Figures 2 and 3, each half of the housing includes bore surfaces 18 and 20 for the idler screws and the bore surface 22 for the power screw. Inasmuch as the thrust on each idler screw is only in one direction special provision is made for the lubrication and thrust balance only through approximately one half of each bore for the idler screws, if the pump is designed for a given fixed direction of rotation. Assuming directions of rotation as indicated by the arrows in Figure 2 the special grooves need only be provided in the idler bore surfaces 20, these grooves being indicated at 24. As will be noted, the grooves are provided in the portions of the idler bores which are approached by the idler screw threads as they move away from the power screw.

Figure 4:
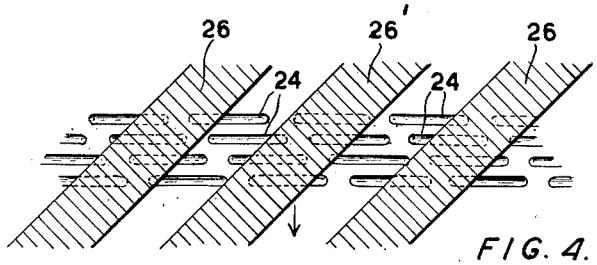
Figure 4 is a diagram illustrating the fashion in which the idler threads cooperate with slots in the housing to provide lubrication and thrust balance.

The grooves 24 may be made quite shallow and are illustrated as somewhat enlarged in their radial depth in Figure 2 for purposes of clarity of disclosure. Desirably, they are of a minimum depth so as to maintain their volumes at a minimum. A preferred arrangement of these grooves is illustrated in Figure 4 wherein they are shown as arranged in helical fashion having helix angles the same as the helix angles of the peripheries of the idler threads but of an opposite hand. The grooves have an axial length which is slightly less than the axial extent of the cylindrical surface of an idler screw thread with the result that no groove 24 at any time communicates simultaneously with the idler screw grooves at opposite sides of an idler screw thread.

The idler screw threads are indicated at 26 and 26' in Figure 4, the representations of the threads being in this figure in the form of developments taken at their cylindrical surfaces. As will be evident from Figure 4 the pressure side of the pump is at the right hand side and the suction at the left hand side of this figure when the idler screw is rotating in the direction of the arrow. As will be apparent this means that liquid under pressure entering a groove 24 from the screw groove will be distributed to the cylindrical surface of the screw to produce effective lubrication and thrust under pressure opposing the thrust applied to the screw. As rotation proceeds the grooves 24 will be successively opened toward the low pressure end of the pump and consequently escape of the liquid contained in a groove may occur toward the suction end of the pump. However, the amount of liquid which may thus pass in a retrograde direction during each revolution of the screws is quite small in comparison with the quantity of liquid which is advanced in the same revolution. The result is that the volumetric efficiency of the pump is not substantially impaired. The rotor is carried on a liquid film which is provided so uniformly as not to be subject to being wiped away by the comparatively sharp edges of the idler screw threads.

While the oil distributing grooves are desirably arranged axially as illustrated and described it will be evident that they may be otherwise disposed in the surfaces of the idler bores so long as they never open to provide communication between adjacent grooves and are of such extent as to afford proper distribution of lubricant.

It will be evident that the advantages of the invention will also be obtained if the pump is operated as a motor driven by liquid under pressure to deliver mechanical power through its shaft.

What I claim and desire to protect by Letters Patent is:

1. A multiple screw device comprising a housing, and at least two intermeshing screws mounted to rotate in bores in said housing, one of said screws having at least one convex thread and the other having at least one concave thread, the peripheral portions of said screws substantially engaging the walls of said bores, the inner surface of the bore receiving the screw with the concave thread being provided with liquid distributing, shallow grooves, each of limited axial length and of a transverse width substantially less than its axial length, the dimensions being such that no liquid distributing groove may be simultaneously in communication with the spaces on opposite sides of a thread of the last mentioned screw.

2. A multiple screw device comprising a housing, and at least two intermeshing screws mounted to rotate in bores in said housing, said screws having threads and the peripheral portions of said screws substantially engaging the walls of said bores, the inner surface of the bore receiving one of said screws being provided with liquid distributing, shallow grooves, each of limited axial length and of a transverse width substantially less than its axial length, the dimensions being such that no liquid distributing groove may be simultaneously in communication with the spaces on opposite sides of a thread of the last mentioned screw.

3. A multiple screw device comprising a housing, and at least two intermeshing screws mounted to rotate in bores in said housing, one of said screws having at least one convex thread and the other having at least one concave thread, the peripheral portions of said screws substantially engaging the walls of said bores, the inner surface of the bore receiving the screw with the concave thread being provided with liquid distributing, shallow grooves, each of limited axial length approaching, but less than, the axial width of the top of a thread of the last mentioned screw and of a transverse width substantially less than its axial length, the dimensions being such that no liquid distributing groove may be simultaneously in communication with the spaces on opposite sides of a thread of the last mentioned screw.

4. A multiple screw device comprising a housing, and at least two intermeshing screws mounted to rotate in bores in said housing, said screws having threads and the peripheral portions of said screws substantially engaging the walls of said bores, the inner surface of the bore receiving one of said screws being provided with liquid distributing, shallow grooves, each of limited axial length approaching, but less than, the axial width of the top of a thread of the last mentioned screw and of a transverse width substantially less than its axial length, the dimensions being such that no liquid distributing groove may be simultaneously in communication with the spaces on opposite sides of a thread of the last mentioned screw.

5. A multiple screw device comprising a housing, and at least two intermeshing screws mounted to rotate in bores in said housing, one of said screws having at least one convex thread and the other having at least one concave thread, the peripheral portions of said screws substantially engaging the walls of said bores, the inner surface of the bore receiving the screw with the concave thread being provided with liquid distributing, shallow grooves, each of limited axial length and of a transverse width substantially less than its axial length, the dimensions being such that no liquid distributing groove may be simultaneously in communication with the spaces on opposite sides of a thread of the last mentioned screw, said liquid distributing grooves being arranged in sets disposed helically, the helix of their disposition being of a hand opposite that of a thread of the last mentioned screw.

6. A multiple screw device comprising a housing, and at least two intermeshing screws mounted to rotate in bores in said housing, said screws having threads and the peripheral portions of said screws substantially engaging the walls of said bores, the inner surface of the bore receiving one of said screws being provided with liquid distributing, shallow grooves, each of limited axial length and of a transverse width substantially less than its axial length, the dimensions being such that no liquid distributing groove may be simultaneously in communication with the spaces on opposite sides of a thread of the last mentioned screw, said liquid distributing grooves being arranged in sets disposed helically, the helix of their disposition being of a hand opposite that of a thread of the last mentioned screw.

7. A multiple screw device comprising a housing, and at least two intermeshing screws mounted to rotate in bores in said housing, one of said screws having at least one convex thread and the other having at least one concave thread, the peripheral portions of said screws substantially engaging the walls of said bores, the inner surface of the bore receiving the screw with the concave thread being provided with liquid distributing, shallow grooves, each of limited axial length approaching, but less than, the axial width of the top of a thread of the last mentioned screw and of a transverse width substantially less than its axial length, the dimensions being such that no liquid distributing groove may be simultaneously in communication with the spaces on opposite sides of a thread of the last mentioned screw, said liquid distributing grooves being arranged in sets disposed helically, the helix of their disposition being of a hand opposite that of a thread of the last mentioned screw.

8. A multiple screw device comprising a housing, and at least two intermeshing screws mounted to rotate in bores in said housing, said screws having threads and the peripheral portions of said screws substantially engaging the walls of said bores, the inner surface of the bore receiving one of said screws being provided with liquid distributing, shallow grooves, each of limited axial length approaching, but less than, the axial width of the top of a thread of the last mentioned screw and of a transverse width substantially less than its axial length, the dimensions being such that no liquid distributing groove may be simultaneously in communication with the spaces on opposite sides of a thread of the last mentioned screw, said liquid distributing grooves being arranged in sets disposed helically, the helix of their disposition being of a hand opposite that of a thread of the last mentioned screw.

MORGAN B. SENNET.

REFERENCES CITED

The following references are of record in the file of this patent:

UNITED STATES PATENTS

| Number | Name | Date |
| --- | --- | --- |
| 547,380 | Marburg, et al. | Oct. 1, 1895 |
| 630,648 | Brewer | Aug. 8, 1899 |
| 1,698,802 | Montelius | Jan. 15, 1929 |
| 1,965,557 | Montelius | July 3, 1934 |
| 2,188,702 | Burghauser | Jan. 30, 1940 |
| 2,236,980 | Ungar | Apr. 1, 1941 |
| 2,277,661 | Booth | Mar. 31, 1942 |
| 2,319,374 | Ungar | May 18, 1943 |

FOREIGN PATENTS

| Number | Country | Date |
| --- | --- | --- |
| 384,355 | Great Britain | Dec. 8, 1932 |
| 432,800 | Great Britain | Aug. 2, 1935 |
| 614,669 | Germany | June 17, 1935 |